United States Patent [19]

Jung et al.

[11] Patent Number: 5,338,489
[45] Date of Patent: Aug. 16, 1994

[54] DESLAGGING GASIFIERS BY CONTROLLED HEAT AND DERIVATIZATION

[75] Inventors: Dick Y. Jung, Fishkill, N.Y.; James K. Wolfenbarger, Torrance, Calif.; Donald D. Brooker, Hopewell Junction, N.Y.; Allen M. Robin, Anaheim; Jerrold S. Kassman, Long Beach, both of Calif.

[73] Assignee: Texaco Inc., White Plains, N.Y.

[21] Appl. No.: 6,028

[22] Filed: Jan. 15, 1993

[51] Int. Cl.$^5$ ............................ C01B 3/22; C01B 3/24
[52] U.S. Cl. .................................................. 252/373
[58] Field of Search .......................................... 252/373

[56] References Cited

U.S. PATENT DOCUMENTS

| | | | |
|---|---|---|---|
| 4,525,176 | 6/1985 | Koog et al. | 48/197 R |
| 4,851,152 | 7/1989 | Najjar | 252/373 |
| 4,952,380 | 8/1990 | Najjar et al. | 252/373 |
| 4,988,368 | 1/1991 | Crenwelg et al. | 252/373 |
| 5,112,366 | 5/1992 | Liu | 252/373 |

*Primary Examiner*—Howard T. Mars
*Attorney, Agent, or Firm*—George J. Darsa; Henry H. Gibson

[57] ABSTRACT

Slag deposits in partial oxidation reactors, like coke gasifiers, are removed by controlling temperature and slag derivatization. Derivatized slag is fluidized and leaves the reactor without solidifying in and filling the reactor outlet.

25 Claims, 1 Drawing Sheet

DESLAGGING GASIFIERS BY CONTROLLED HEAT AND DERIVATIZATION

BACKGROUND OF THE INVENTION

1. Field of the Invention

This invention concerns deslagging partial oxidation reactors. More particularly, slag is effectively removed from gasifiers under carefully controlled temperature and derivatizing conditions.

2. Description of Related Information

Petroleum, coal and other organic natural resources are used to make fuels, such as for transportation, heating and power generation, as well as feedstocks to make materials which go into most manufactured goods, including clothes, food, cars, buildings and other merchandise. Diminishing resources have led to increasing use of organic feedstocks generally, and particularly in the United States, which are of lower grade and from more impure sources, such as heavier and poorer quality crude oil. These impure feedstocks need to be refined, or upgraded, more than lighter petroleum to make products having acceptable properties. A common upgrading process, called coking, recovers valuable hydrocarbon products from residual oils or other low grade petroleum products. Coking produces carbonaceous by-products called coke. Coke, residual oils and by-products made from heavy crude oil are generally impure containing relatively high levels of contaminants such as sulfur and various metals like vanadium, nickel and iron.

Unlike high purity grade coke which can be used to make electrodes, impure coke has little value due to the contaminants. Impure coke, as well as other carbonaceous materials containing metal contaminants can, however, be used as feedstock for partial oxidation reactions producing mixtures of hydrogen and carbon monoxide gases, called synthesis gas, or simply syngas. Syngas is a feedstock for making a host of useful organic compounds or can be used as a clean fuel to produce power in an environmentally sound way.

Partial oxidation of impure coke or other contaminated materials produces slag by-product which collects on the inside surface of the partial oxidation reactor. The slag deposits build up in the reactor or outlet to a level which prevents effective partial oxidation requiring shutdown to remove slag, called deslagging, from the partial oxidation reactor.

Slag deposition can be avoided by adding materials which prevent solid slag deposition, such as fluxing agents, which prevent slag solidification, or washing agents, which help carry slag from the reactor. These additives prevent slag build up generally by mixing with the metal contaminants to prevent slag formation or its ability to build up deposits in the reactor. The use of these additives can be disadvantageous by increasing the amount of solid by-product of the partial oxidation reaction and by lowering by-product recovery value by diluting the concentration of valuable slag components, such as vanadium. The additives can also adversely impact the partial oxidation reaction, such as by reducing reaction efficiency. The use of such additives is described, for example, in U.S. Pat.. No. 4,952,380 (Najjar et al.) and the patents therein listed.

Deslagging is limited by the nature of the slag and other components or aspects of the partial oxidation reactor. Due to the high melting point of the solid slag, it cannot be removed simply by heating it until it melts since reactor materials generally cannot withstand such high temperatures. Slag which can be derivatized to another form having a lower melting or subliming point provides an opportunity for slag removal. However, merely derivatizing the slag and heating the reactor to make fluid, derivatized slag will generally produce derivatized slag which solidifies in and blocks the reactor outlet, thereby requiring slag removal by mechanical means. Alternatively, U.S. Pat. No. 4,525,176 (Koog et al.) describes a deslagging technique using a movable burner assembly to control slag removal and avoid blocking the reactor outlet.

Deslagging can also damage the reactor. Refractory used to insulate the reactor vessel can be corroded, eroded or otherwise attacked by molten slag, and particularly derivatized slag like pentavalent vanadates. Damaged or lost refractory needs to be replaced and requires reactor shutdown.

SUMMARY OF THE INVENTION

This invention concerns processes for removing slag from partial oxidation reactors comprising four steps. Step (1) involves stopping a partial oxidation reaction which has deposited solid slag in a partial oxidation reactor. Step (2) involves adding at least one derivatizing agent to the reactor which reacts with the slag to make derivatized slag having a lower fluidizing point. Step (3) involves providing a temperature in the reactor at which derivatized slag fluidizes and leaves the reactor through an outlet. Step (4) involves controlling the deslagging rate by regulating derivatizing agent and temperature levels in the reactor to prevent slag from filling the outlet.

Processes for making synthesis gas are also provided which comprise seven steps. Step (1) involves adding free-oxygen-containing gas and organic feedstock containing slag-depositing material to a reactor. Step (2) involves reacting the feedstock and gas through a partial oxidation reaction to make synthesis gas containing hydrogen and carbon monoxide gases, which leave the reactor through an outlet, and slag which collects in the reactor. Step (3) involves recovering the synthesis gas. Slag is removed by the following steps. Step (4) involves stopping the partial oxidation reaction. Step (5) involves adding at least one derivatizing agent to the reactor which reacts with the slag to make derivatized slag having a lower fluidizing point. Step (6) involves providing a temperature in the reactor at which derivatized slag fluidizes and leaves the reactor through the outlet. Step (7) involves controlling the deslagging rate by regulating derivatizing agent and temperature levels in the reactor to prevent slag from filling the outlet.

DETAILED DESCRIPTION OF THE INVENTION

There is a need for removing slag from partial oxidation reactors in a way which does not block the reactor outlet or require additives which can lower either reaction efficiency or the recovery value of slag. It would be desirable if the deslagging could be done using existing reactor and burner design with minimized disruption of synthesis gas production. This invention achieves partial oxidation reactor deslagging without the need for additives or additional or alternative apparatus, avoiding both reactor damage and lower reaction efficiency, while maximizing slag recovery value.

Partial oxidation reactions generally involve reacting organic compounds with oxygen ($O_2$) under conditions which favor the formation of partially, as opposed to fully, oxidized material. Partial oxidation can be used to make syngas, which is a mixture of hydrogen ($H_2$) and carbon monoxide (CO). A general expression for syngas production by partial oxidation is given in Equation 1.

$$O_2 + 2HC \rightarrow H_2 + 2CO$$

Equation 1. Syngas Synthesis by Partial Oxidation

In Equation 1, HC represents one or more materials containing hydrogen and carbon. Partial oxidation is also commonly called gasification since typically liquid and/or solid feedstock is used to make hydrogen and carbon monoxide gases.

The partial oxidation feedstock is one or more materials containing hydrogen and carbon. Generally, the feedstock is one or more organic compounds which provide a source of hydrogen and carbon for the partial oxidation reaction. Fluid hydrocarbonaceous fuel, meaning a composition comprised of one or more compounds of hydrogen and carbon in a fluid state, can be used as feedstock. The fluid can be either gaseous, liquid or fluidized solid. Typical fluid hydrocarbonaceous fuels include, among others, one or mixtures of the following: petroleum products, including distillates and residues, such as crude petroleum, reduced crude, gasoline, naphtha, kerosine, crude petroleum asphalt, gas oil, residual oil, tar sand oil, shale oil, cycle gas oil, tire oil, oil derived from coal, lignite, aromatic hydrocarbons (such as benzene, toluene, and xylene fractions), coal tar, furfural extract of coke or gas oil; oxygenated hydrocarbonaceous organic materials including carbohydrates, cellulosics, aldehydes, organic acids, alcohols, ketones, oxygenated fuel oil; waste liquid and by-products from chemical processes containing oxygenated hydrocarbonaceous organic materials; gaseous hydrocarbons and mixtures, including natural gas, refinery offgases or other gas streams containing hydrogen and/or saturated or unsaturated hydrocarbons like methane, ethane, ethene, propane, propene, and so on; waste gases including organic nitrogen, sulfur or oxygen compounds; and similar materials. Another feedstock is solid carbonaceous material, meaning a composition comprised of one or more solid compounds of carbon. Typical solid carbonaceous material includes, among others, one or mixtures of the following: coal, such as anthracite, bituminous, subbituminous; coke from coal; lignite, residue derived from coal liquefication; crude residue from petroleum distillation and cracking processes; oil shale; tar sand; petroleum coke; asphalt; pitch; particulate carbon (soot); concentrated sewer sludge; tank and pond bottoms; separator sludge; air flotation solids; and similar materials. Preferred feedstocks include low grade by-products of heavy crude oil refining, especially coke and residual oils.

Carbonaceous or other material which is solid at ambient temperature can be fluidized in any appropriate manner. In the case of some pitches, asphalt, and tar sand, it may be possible to use them as liquids by heating them to temperatures up to their decomposition temperature. Feedstock containing large amounts of water can be pre-dried to a moisture content suitable to facilitate grinding and/or slurrying, such as from about 2 to about 20 weight percent water, depending on the nature of the feedstock. Solid carbonaceous material is generally provided in particulate form, such as by grinding preferably to a particle size which passes through an ASTM E11-70 Sieve Designation Standard (SDS) 1.4 mm Alternative No. 14. A suspending medium, such as a slurrying agent, in which the solid feedstock is suspended or entrained may be used. The suspending medium may be any material(s) effective for fluidizing solid feedstock. Typical suspending media include, among others, one of more of the following: water; liquid hydrocarbonaceous material including oxygen-, sulfur- or nitrogen-containing organic liquids; carbon dioxide; steam; nitrogen; recycle synthesis gas; and similar materials. The solids content of the feedstock in suspending medium may be any effective amount, typically ranging from about 5 to about 80, preferably from about 45 to about 70, weight percent, depending upon the characteristics of the solid and the suspending medium. The solid carbonaceous material is preferably provided as a pumpable slurry in a suspending medium. Typically, ground solid carbonaceous or other material is slurried with a suspending medium in a slurry preparation tank, where the slurry is prepared to a desired concentration, and thereafter pumped to the partial oxidation reactor by means of a slurry feed pump. The solid carbonaceous material may also be provided as a dry feed, such as fluidized or suspended in a gaseous material such as steam, nitrogen, carbon dioxide, or recycled synthesis gas. When the feedstock is liquid or gaseous, no suspending medium or entraining gas is required.

Fluid hydrocarbonaceous fuels and solid carbonaceous materials may be used separately or together and may be combined with any other material. Other material which can be added as feedstock includes any other organic compounds including, among others, solid waste material such as garbage and beneficiated garbage, or other carbon-containing materials. When carbonaceous feedstock without hydrogen is used, a source of hydrogen, like water or steam, can be added as feedstock for the partial oxidation reaction.

Some or all of the feedstock contains slag-depositing material, meaning one or more elements or compounds which under partial oxidation reaction conditions make solid slag which can collect in the partial oxidation reactor. The slag-depositing material in the feedstock is typically present as impurity or contaminant. The slag-depositing material can vary depending on the feedstock and source of its impurities. Typically, slag-depositing material is mainly the non(hydro)carbonaceous part of the feedstock, meaning the elements and compounds other than only carbon or hydrocarbons containing only hydrogen and carbon. The slag-depositing material can include some of the carbonaceous part of the feedstock to the extent hydrogen or carbon is present in slag deposits. The slag-depositing material has a slagging component which is an element or compound which, alone or in combination with other material in the reactor, such as oxygen or sulfur, forms slag in the partial oxidation reactor. Typical slagging elements include, among others, one or mixtures of the following: transition metals, such as vanadium, iron, nickel, tantalum, tungsten, chromium, manganese, zinc, cadmium, molybdenum, copper, cobalt, platinum, or palladium; alkali or alkali earth metals, such as sodium, potassium, magnesium, calcium, strontium, or barium; and others including aluminum, silicon, phosphorus, germanium, gallium; and the like. Preferred slagging elements are those which produce slag which can be derivatized during deslagging as later discussed, such as molybdenum, niobium, tantalum, tungsten, and particularly vanadium, or the like.

The amount of slagging elements in the feedstock may be any amount effective at producing slag deposits during partial oxidation. The feedstock typically contains up to about 5, preferably from about 0.001 to about 1, and most preferably from about 0.01 to about 0.5, weight percent of slagging elements. The amount of slag-depositing material and slagging elements can vary significantly between feedstocks as well as for a particular feedstock depending upon how the slag-depositing impurities are provided. For example, petroleum coke will have higher slag-depositing material content when the coker feed includes more contaminated material, such as sludge or other contaminated waste streams.

Free-oxygen-containing gas may be any gas containing oxygen in a form suitable for reaction during the partial oxidation process. Typical free-oxygen-containing gases includes, among others, one of more of the following: air; oxygen-enriched air, meaning having greater than 21 mole percent oxygen; substantially pure oxygen, meaning greater than 95 mole percent oxygen; and other suitable material. Commonly, the free-oxygen-containing gas contains oxygen plus other gases derived from the air from which oxygen was prepared, such as nitrogen, argon or other inert gases.

Other materials may optionally be added to the gasification feedstock or process. Any suitable, including known, additives may be provided, such as fluxing or washing agents, temperature moderators, stabilizers, viscosity reducing agents, purging agents, inert gases or other useful materials.

The proportion of feedstock to free-oxygen-containing gas, as well as any optional components, may be any amount effective to make syngas. Typically, the atomic ratio of oxygen, in the free-oxygen-containing gas, to carbon, in the feedstock, is from 0.6 to about 1.6, preferably from about 0.8 to about 1.4. When the free-oxygen-containing gas is substantially pure oxygen, the ratio may be from about 0.7 to about 1.5, preferably about 0.9. When the oxygen-containing gas is air, the ratio may be from about 0.8 to about 1.6, preferably about 1.3. When water or other temperature moderator is used, the weight ratio of temperature moderator to carbon in the feedstock may range up to 2, preferably from about 0.2 to about 0.9, and most preferably about 0.5. The relative proportions of feedstock, oxygen, and any water or other temperature moderator in the feedstreams are carefully regulated to derivatize a substantial portion of the carbon in the feedstock, generally at single pass conversion rates of from about 75 to substantially 100, and preferably from about 85 to about 98, weight percent of the carbon to carbon oxides like carbon monoxide and carbon dioxide, and maintain a suitable autogenous reaction zone temperature.

The charge, including feedstock, free-oxygen-containing gas and any other materials, is delivered to the partial oxidation reactor. Any effective, including known, means may be used to feed the feedstock into the reactor. Generally, the feedstock and gas are added through one or more inlets or openings in the reactor. Typically, the feedstock and gas are passed to a burner which is located in the reactor inlet. Any effective burner design may be used to assist the addition or interaction of feedstock and gas in the reactor, such as an annulus-type burner described in U.S. Pat. No. 2,928,460 (Eastman et al.), U.S. Pat. No. 4,328,006 (Muenger et al.) or U.S. Pat. No. 4,328,008 (Muenger et al.). Alternatively, the feedstock may be introduced into the upper end of the reactor through a port. Free-oxygen-containing gas is typically introduced at high velocity into the reactor through either the burner or a separate port which discharges the oxygen gas directly into the feedstock stream. By this arrangement the charge materials are intimately mixed within the reaction zone and the oxygen gas stream is prevented from directly impinging on and damaging the reactor walls.

Any effective, including known, reactor design can be used. Typically, a vertical, cylindrically shaped, steel pressure vessel can be used. Illustrative reactors and related apparatus are disclosed in U.S. Pat. No. 2,809,104 (Strasser et al.), U.S. Pat. No. 2,818,326 (Eastman et al.), U.S. Pat. No. 3,544,291 (Schlinger et al.), U.S. Pat. No. 4,637,823 (Dach), U.S. Pat. No. 4,653,677 (Peters et al.), U.S. Pat. No. 4,872,886 (Henley et al.), U.S. Pat. No. 4,456,546 (Van der Berg), U.S. Pat. No. 4,671,806 (Stil et al.), U.S. Pat. No. 4,760,667 (Eckstein et al.), U.S. Pat. No. 4,146,370 (van Herwijner et al.), U.S. Pat. No. 4,823,741 (Davis et al.), U.S. Pat. No. 4,889,540 (Segerstrom et al.), U.S. Pat. No. 4,959,080 (Sternling), and U.S. Pat. No. 4,979,964 (Sternling). The reaction zone preferably comprises a downflowing, free-flow, refractory-lined chamber with a centrally located inlet at the top and an axially aligned outlet in the bottom.

The refractory may be any effective material for a partial oxidation reactor. The refractory may be prefabricated and installed, such as fire brick material, or may be formed in the reactor, such as plastic ceramic. Typical refractory includes, among others, one or mixtures of the following: metal oxides, like chromium oxide, magnesium oxide, ferrous oxide, aluminum oxide, calcium oxide, silica, zirconia, and titania; phosphorus compounds; and the like. The relative amount of refractory materials may be any effective proportion.

The partial oxidation reaction is conducted under any effective reaction conditions, and preferably the minimum conditions effective at derivatizing a desired amount of feedstock to syngas. Reaction temperatures typically range from about 900° C. to about 2,000° C., preferably from about 1,200° C. to about 1,500° C. Pressures typically range from about 1 to about 250, preferably from about 10 to about 200, atmospheres. The average residence time in the reaction zone generally ranges from about 0.5 to about 20, and normally from about 1 to about 10, seconds.

The partial oxidation reaction is conducted under highly reducing conditions for syngas production. Generally, the concentration of oxygen in the reactor, calculated in terms of partial pressure, during partial oxidation is less than about $10^{-5}$, and typically from about $10^{-12}$ to about $10^{-8}$, atmospheres.

Once the charge materials enter the reactor, incomplete combustion takes place in the reaction chamber to make a product stream principally containing hydrogen ($H_2$), carbon monoxide (CO), steam ($H_2O$), and carbon dioxide ($CO_2$). Other gases often present include hydrogen sulfide ($H_2S$), carbonyl sulfide (COS), methane ($CH_4$), ammonia ($NH_3$), nitrogen ($N_2$), volatile metals, and other inert gases such as argon (Ar). The product composition will vary depending upon the composition of the charge materials and reaction conditions. Typically, the product contains principal gaseous components and concentrations as given in Table I, in volume percent on a dry basis, based on using free-oxygen-containing gas which is either substantially pure oxygen or air.

TABLE I

| | Typical Product Gas (Volume Percent) | |
|---|---|---|
| | Feed Gas | |
| Gas | $O_2$ | Air |
| CO | 30–60 | 10–35 |
| $H_2$ | 25–60 | 4–20 |
| $CO_2$ | 2–35 | 2–25 |
| $H_2S$ + COS | 0–5 | 0–3 |
| $N_2$ + Ar | 0–5 | 45–70 |
| $CH_4$ | 0–1 | 0–1 |
| $NH_3$ | 0–0.5 | — |

The product leaving the reactor contains non-gaseous by-products, which vary in amount and type depending upon the feedstock composition. The non-gaseous by-product is typically particulates, generally carbon and inorganic ash. Much of the non-gaseous by-product is entrained in the product stream and carried out of the reactor. Some of the non-gaseous by-product contacts the inside surfaces of the reactor and may stick to the surface as slag. Slag is essentially fused mineral matter, i.e. ash, by-product of the slag-depositing material in the feedstock. Slag may also contain carbon, such as soot.

Slag composition will vary depending on the type of slag-depositing material in the feedstock, reaction conditions and other factors influencing slag deposition. Typically, slag is made of oxides and sulfides of slagging elements. For example, slag made from impure coke or resid usually contains siliceous material, like glass and crystalline structures such as wollastinite, gehlenite and anorthite; vanadium oxide, generally in a reduced state like the trivalent vanadium trioxide ($V_2O_3$); spinel, such as having a composition represented by the formula $AB_2O_4$ wherein A is iron and magnesium and B is aluminum, vanadium and chromium; sulfides of iron and/or nickel; and metallic iron and nickel. Slag having a melting point below the temperature in the reactor, can melt and flow out the reactor, such as through outlet located at the bottom of the reactor, as molten slag.

The gas product, molten slag, or other by-product which flows out of the reactor may be processed by any effective, including known, manner. Product stream leaving the reaction zone is generally cooled, by any suitable, including known, procedure such as described in the previously noted patents, to any desired temperature to assist product stream processing and handling. Typically, the product stream is cooled directly and/or indirectly, such as by quenching or radiant/convective cooling. In direct cooling by quenching, the product gas is cooled or quenched in a quench vessel, preferably located directly below the reactor vessel, generally by bubbling the product stream through aqueous liquid in the quench vessel. In radiant or indirect cooling, the product stream leaves the reaction zone and enters a radiant or convective cooler, such as through heat exchange surface made up of a series of connected tubes containing water or steam.

Nongaseous by-product, such as molten slag, which flows out of the reactor can be collected in a quench chamber or slag pot. Slag which collects in a quench chamber or other pressurized vessel can be discharged, such as periodically, to a lockhopper or other container.

Slag having a higher melting point than the temperature in the reactor, generally builds up as a solid in the reactor, typically on the surfaces of the refractory lining the reactor. Slag deposits increase as the reaction proceeds. The rate that slag collects can vary widely depending on the concentration of slag-depositing metal in the feedstock, reaction conditions, use of washing agents, reactor configuration and size, or other factors influencing slag collection. The amount of slag builds to a level where slag removal is desired. Although slag removal can be conducted at any time, the partial oxidation reaction is typically conducted as long as possible to maximize syngas production.

When deslagging is desired, the partial oxidation reaction is stopped in any effective way, typically by stopping feedstock addition. Before deslagging, it may be desirable to remove product gas left in the reactor. This may be done by any effective means such as by pumping out, i.e. depressurizing, the reactor or, preferably, by purging, i.e. flushing out, the reactor with an inert gas like nitrogen or steam. Deslagging can be done at any time, such as immediately or after any period of time, following the partial oxidation reaction. For example, before or after deslagging the reactor can be inspected, repaired, or serviced, or other operations performed, such as exchanging burners, pretreating slag, adjusting reactor temperature, or any other desired activity.

Deslagging is based on derivatizing at least part of the deposited slag from a solid metal or compound having a high melting point to a molten derivative having a lower melting point. The kind of deslagging derivatization, i.e. reaction, that occurs varies depending upon the slag composition. The deslagging process takes advantage of slag component properties. Slag, formed from the slagging components in the feedstock, generally contains metal or metal compounds in a reduced state, due to the highly reducing conditions under which slag is formed during the partial oxidation reaction. Typical slag deposits have, among others, one or more of the following: oxides and sulfides of transition metals, particularly Group VB, VIB and VIIB metals like vanadium, chromium, manganese, niobium, molybdenum, tantalum and tungsten, generally in a reduced, typically di-, tri- or tetra-valent, state, such as vanadium trioxide ($V_2O_3$), chromium sesquioxide ($Cr_2O_3$), manganese oxide ($Mn_3O_4$), tantalum trioxide ($Ta_2O_3$), tungsten dioxide ($WO_2$) or disulfide ($WS_2$), and the like.

The slag is derivatized, meaning the slag undergoes a chemical reaction with a derivatizing agent, to produce derivatized slag, meaning chemical derivatives which are the reaction product of slag with the derivatizing agent. Derivatizing agents differ from other slag treating agents, such as washing or other agents which physically or chemically complex or combine with the slag to wash or flux it from the reactor. The derivatizing agent chemically combines, i.e. reacts, with slag elements to produce chemical derivatives having lower fluidizing points. Representative slag and corresponding derivatized slag, along with melting temperatures, are given in Table II.

TABLE II

| Slag Species and Melting Temperature | | | |
|---|---|---|---|
| Original Slag | Melting Temperature(°C.) | Derivatized Slag | Melting Temperature(°C.) |
| $V_2O_3$ | 1,970 | $V_2O_5$ | 690 |
| $Mo_2O_3$ | — | $MoO_3$ | 795 |

TABLE II-continued

| Slag Species and Melting Temperature | | | |
|---|---|---|---|
| Original Slag | Melting Temperature(°C.) | Derivatized Slag | Melting Temperature(°C.) |
| $Cr_2O_3$ | 2,266 | $K_2CrO_4$ | 968 |
| $WO_2$ | 1,500–1,800 | $Na_2WO_4$ | 698 |
| MnO | — | $MnCl_2$ | 650 |
| Pd | 1,552 | PdO | 870 |

The derivatizing agent is any material which reacts with the slag to form derivatized slag having a lower melting point. Typically since the slag is in a reduced form, the derivatizing agent can be an oxidant which reacts with the slag to produce oxidized slag having a lower melting point than the original slag. Oxidized slag is typically metal oxide having a higher oxidation level than the form of the metal in the original slag. The derivatizing agent can be a combination of materials, such as oxidant and alkali metal or halide, which both react with the slag to form slag derivatives having lower melting points. Typical derivatizing agents include, among others, one or mixtures of the following: oxidants, such as free-oxygen-containing gas as described previously for the partial oxidation reaction, or a material which can provide free-oxygen-containing gas, such as carbon dioxide; haliding agent such as reactive components containing chlorine, fluorine, or bromine, like HCl and $Cl_2$; and similar materials. A preferred derivatizing agent is oxygen ($O_2$).

The temperature in the reactor during deslagging is adjusted to melt the derivatized slag. The reactor temperature is therefore generally kept above the melting point of the derivatized slag. This minimum temperature can vary depending upon the particular type of derivatized slag or other conditions, such as pressure or slag composition, which influence melting of the derivatized slag. The reactor temperature is generally above about 300° C., preferably from about 700° C. to about 1,600° C. and most preferably from about 900° C. to about 1,500° C. The pressure in the reactor during deslagging may be similar to or less than, such as atmospheric, that provided during partial oxidation as noted previously.

Heat can be provided to the reactor by any effective means. Generally, heat can be produced within the reactor by burning fuel in the reactor. Alternatively, heat can be generated externally and supplied directly or indirectly, such as by convection or adding hot gases, like combustion products or heated inert gas, to heat the reactor. Typically, fuel and oxidant are added and heat is produced by combusting, i.e. burning, the fuel. When the derivatizing agent is oxidant, the concentration of derivatizing agent in the reactor can be provided by adding more oxidant than is consumed by fuel combustion. The excess oxidant is then available for slag conversion.

The fuel for adjusting the temperature during deslagging can be any material effective at producing heat upon combustion to provide the temperature necessary for deslagging. Typical fuels include, among others, one or mixtures of the following: fluid hydrocarbonaceous fuel or solid carbonaceous material as described previously for the partial oxidation reaction; and similar materials. Preferred fuels include light hydrocarbons, like methane, propane, naphtha, or similar materials. To avoid complicating deslagging conditions, the fuel is preferably a clean burning material, such as natural gas or methane or other material producing gaseous products which do not interfere with deslagging.

Other materials may optionally be included with deslagging. Any desired, including known, additives may be used, such as one or more diluent, washing agent, fluxing agent, neutralizing agent or other useful material. Typical diluents include temperature moderators as previously described for the partial oxidation reaction. Typical washing or fluxing agents include those described previously for the partial oxidation reaction. Neutralizing agent can be added to adjust the acidity of the slag, such as to reduce the corrosiveness of the derivatized slag on reactor components and during slag recovery. Typical neutralizing agents include bases, such as sodium hydroxide, potassium hydroxide, calcium hydroxide, calcium carbonate, ammonia, ammonium hydroxide, or the like.

Adding derivatizing agent and adjusting the reactor temperature without adequately considering factors influencing deslagging will not produce effective deslagging. Unless carefully prevented, melted slag will flow to the reactor outlet faster than slag can pass through the outlet and thereby fill the outlet. If the outlet is filled with slag, heat loss at the outlet can cause the slag, including derivatized slag, in the outlet to solidify thereby blocking the outlet. Solid slag blocking the outlet would generally require removal by mechanical means, causing an expensive, complete and lengthy reactor shutdown.

Heat loss at the reactor outlet occurs by radiation and direct contact with cooler temperatures outside the reaction chamber. Typically, the reactor outlet leads to a cooling chamber, such as a quench chamber or radiant cooler. The amount of heat applied to the reactor outlet has to at least equal the heat loss, otherwise the outlet temperature will drop. If the outlet temperature is below the melting point of the derivatized slag, the slag in the outlet will solidify in and plug the outlet. The reactor outlet temperature must be high enough for melted slag to pass through and not solidify in the outlet. The outlet temperature can be controlled by any effective means such as by insulating or other heat loss reducing means, by applying heat by any means, such as a continuous flow of hot gas through the outlet.

The levels of derivatizing agent and temperature in the reactor are carefully regulated during deslagging. The level of derivatizing agent in the reactor is any amount effective at derivatizing the slag and controlling the amount of fluidized slag so that the outlet does not become filled with slag. The amount of derivatizing agent can vary depending upon the kind of derivatizing agent or slag, temperature, reactor configuration, outlet heat loss, or other factors influencing the amount or rate of deslagging.

The concentration of derivatizing agent can be given in terms of the partial pressure of fluid derivatizing agent in the reactor. Generally, the partial pressure of derivatizing agent which provides derivatized slag is dependent on temperature. For example, the minimum partial pressure of oxygen, $P_{O2}$, in atmospheres, which provides vanadium pentoxide as a function of temperature, T in degrees kelvin, is given in Equation 2.

$$\text{Log } P_{O2} = -6658/T + 2.859$$

Equation 2: $O_2$ Partial Pressure versus Temperature

A lower concentration of derivatizing agent is therefore needed to maintain slag in its derivatized stage at lower temperatures. The partial pressure of derivatizing agent can be gradually increased during deslagging and may range from initially 0 up to many atmospheres, at the end of deslagging, preferably from initially about 0 up to about 3, and most preferably from initially about 0 up to about 0.5 atmospheres. The concentration of derivatizing agent in the reactor can vary depending on the amount of other materials provided.

Derivatizing agent and fuel can be fed to the reactor by any effective means, such as through a burner used in the partial oxidation reaction. Preferably, the partial oxidation process burner is used in deslagging, although another burner, like a preheating burner for partial oxidation or specialized burner for deslagging, can be substituted in place of the process burner. The process burner can be purged, such as with an inert gas like nitrogen, and cleaned, such as with water feed, following partial oxidation.

The amount of fuel needed depends on the amount of heat loss, reactor geometry, operating conditions such as temperature and pressure, feed temperatures and composition, as well as slag composition and deposit location. The amount of fuel oxidant can be less than, equal to or greater than a stoichiometric amount for complete fuel combustion. When oxidant is used as a derivatizing agent, the amount of oxidant exceeds the amount needed to burn the fuel during deslagging. When fuel is used, the molar amount of oxidant to fuel during deslagging is generally at least $\theta$, meaning the molar amount of oxidant needed for stoichiometric combustion, preferably from about $1.0001 \times \theta$ to about $40 \times \theta$, and most preferably from about $1.01 \times \theta$ to about $4 \times \theta$.

Slag deposits in the reactor or outlet can be monitored using any effective, including known, means. Monitoring slag build-up is important to determine when deslagging is needed. Slag deposits can also be monitored during deslagging to measure the progress and completion of deslagging. Slag deposits can be observed visually by any effective means. For example, a borescope can be put in a reactor opening and positioned to provide a view of the reactor walls and/or outlet. Visual observation can also be made using fiber optics. For example, a fiber optic line can be sighted by the burner to detect light radiating from slag or refractory in the reactor outlet or other area. Slag thickness in the outlet can be measured, for example, using nuclear or sonar detection where variations in the detection signal indicate changes in slag thickness. Variations in temperature measurements, such as using thermocouples at different locations along the reactor walls or outlet, can also provide means for detecting slag deposits. Slag deposits in the reactor outlet can also be monitored by detecting pressure change in the reactor. Increasing slag deposits in the reactor outlet can constrict flow through the outlet shown by a build-up of pressure in the reactor. Correspondingly, pressure drops in the reactor can indicate a clearing of slag deposits obstructing the reactor outlet.

The monitoring means may be used in conjunction with other means, such as purging with inert gas to cool and protect the monitor from the high temperature in the reactor.

Fuel can be added to the reactor at a rate which when burned produces the desired temperature in the reactor. Fuel can be added in any effective manner, such as continuously or intermittently, to provide the desired reactor temperature. The rate can vary depending upon the type of fuel, reactor size, oxidant to fuel ratio, and other factors influencing fuel demand. Fuel is usually added so that the rate of heat released from combustion is up to about 1,000, preferably from about 0.01 to about 10, and most preferably from about 0.1 to about 2, megawatts.

Temperature during deslagging can vary within the reactor depending upon reaction conditions such as reactor configuration and materials, slag deposits, gas flow rate, or other factors effecting temperature variations. The temperature in the reactor may be lower at the inside surface than in the middle of the reaction chamber and decrease farther from the burner and flame or nearer the reactor outlet. The temperature at the inside surface is preferably less than the temperature that would produce significant loss of refractory. Typically, the temperature at the surface is less than about 1,600° C., and preferably from about 600° C. to about 1,500° C.

One method of controlling deslagging involves setting up a temperature gradient, meaning a range of temperatures, within the reactor. One kind of temperature gradient has a lower temperature at the outlet with temperature increasing farther away from the outlet. With a vertical, cylindrically shaped reactor having a burner near the top of the reactor and the outlet centered at the bottom of the reactor, the temperature gradient would be axial, meaning oriented along the axis of the reactor, in which temperature increases higher in the reactor and away from the bottom outlet. An axial temperature gradient takes advantage of the relationship in Equation 2, that lower temperatures provide derivatized slag formation at lower derivatizing agent concentrations in terms of partial pressure in the reactor, to control deslagging. By starting the deslagging with little or no derivatizing agent and gradually increasing derivatizing agent during deslagging, derivatized slag can be formed initially at or near the outlet and gradually form farther away from the outlet towards the higher temperature portion of the reactor. This technique can be effective at preventing slag from blocking the outlet during deslagging.

The deslagging process can be used to remove essentially all or any desired portion of slag deposits. Preferably, a maximum amount of slag is removed to maximize slag recovery and the duration of subsequent gasification processing before more deslagging is needed. In some gasification systems it may be desirable to retain a protective layer or deposit of slag on the reactor walls to extend refractory life and act as thermal insulation.

Derivatized slag which leaves the reactor can, and generally does, carry underivatized slag with it. The recovered slag product of deslagging can therefore have a composition similar to the original slag but wherein some or all of the slagging component or associated material is in the derivatized, such as oxidized, state. Typically, the recovered slag contains metals and/or metal compounds as found in, and derived from the slag deposits, such as previously described. The recovered slag will generally have a significant concentration of valuable metal, such as vanadium or other Group VB, VIB and VIIB metals, which can be purified and recovered using any effective, including known, means.

The slag leaving the reactor can be collected by any effective, including known, means. For example, slag can be retained in a quench or cooling vessel below the reactor outlet or in a slag pot, meaning a vessel for receiving slag directly or indirectly from a reactor outlet. Typically, slag is collected in the quench or cooling vessel and periodically discharged into a slag pot or lockhopper. When slag is collected in an aqueous medium, such as a quench vessel or slag pot containing water, some of the slag components may alter the pH of the water. A neutralizing agent may be provided, either directly to the water or indirectly such as part of the gasification charge, to maintain moderate pH levels in the slag waters.

Deslagging can be repeated, such as periodically, whenever slag deposits rebuild to where removal is desired.

Figure 1:
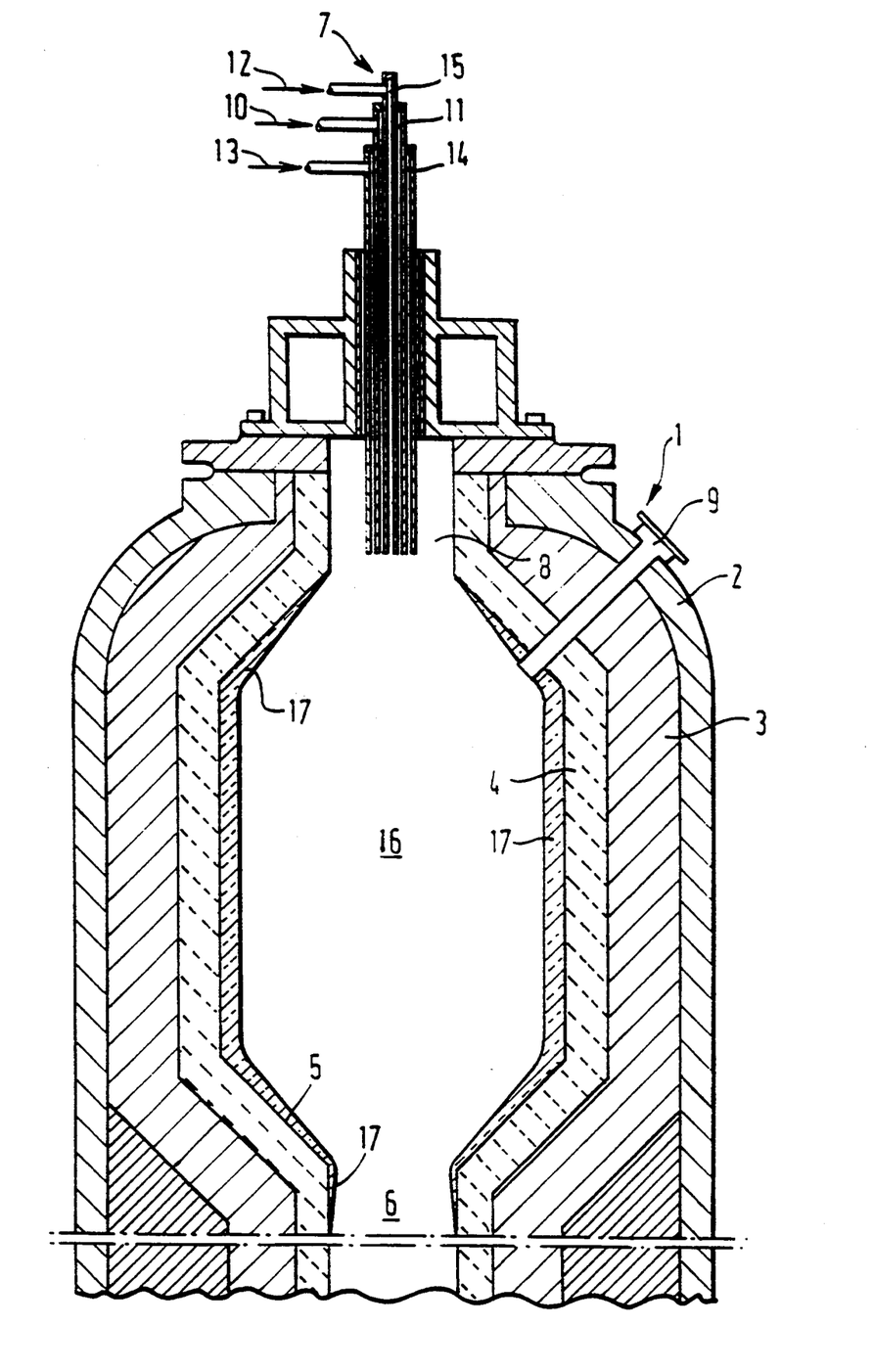
The accompanying drawing shows a schematic Figure of an embodiment of this invention.

In a typical embodiment, as shown in FIG. 1, a partial oxidation reactor 1 is made of a cylindrically shaped steel pressure vessel 2 lined with refractories 3 and 4. The bottom refractory 5 slopes to outlet 6. Burner 7 passes through inlet 8 at the top of the reactor 1. A borescope 9, containing a sight path surrounded by an annular purge gas passage, is placed through the reactor to observe slag deposits in the reactor and outlet 6. The reactor is also equipped with a pyrometer and thermocouples, not shown, to monitor reactor temperature. For partial oxidation, feedstock is fed through line 10 to an inner annular passage 11 in burner 7. Free-oxygen-containing gas is fed through lines 12 and 13 to central and outer annular passages 14 and 15, respectively. The partial oxidation reaction is conducted at temperatures of from about 1200° C. to about 1500° C. and at pressures of from about 10 to about 200 atmospheres. The feedstock reacts with the gas in reaction chamber 16 making synthesis gas and by-products including slag which accumulates on the inside surface 17 of the reactor 1 and outlet 6. Synthesis gas and fluid by-products leave the reactor through outlet 6 to enter a cooling chamber or vessel, not shown, for further processing and recovery.

After stopping the partial oxidation reaction such as by discontinuing charge addition the reactor 1 is purged with nitrogen. After cleaning the slurry feed line 10 and inner annular passage 11 with water, fuel is fed through line 12 and oxygen is fed through lines 10 and 13 and passed through burner 7 and burned in reaction chamber 16. The amount of oxidant is initially less than stoichiometric until the desired deslagging temperature, of between about 900° C. to about 1200° C. is reached. Deslagging can be started by adding derivatizing agent, like excess free-oxygen-containing gas, through line 11 into the reactor. The excess oxygen reacts with the deposited slag 17 to make derivatized slag having a lower melting point. The slag flows down the reactor surface and out of the reactor through outlet 6 for further processing and recovery.

The following examples present illustrative embodiments of this invention without intending to limit its scope. All percentages given in the disclosure and claims are in weight percent, unless otherwise stated.

EXAMPLES

Example 1: Gasification With Deslagging

This example illustrates an embodiment for making synthesis gas and deslagging the gasifier. The feedstock comprises petroleum coke. A coke slurry is prepared by passing coke through a metal detector and magnetic separator to remove metal objects before being fed to a hammermill which crushes the coke. The crushed coke is passed to a rod mill where it is ground with water to produce an aqueous slurry having about 62% solids of particulates smaller than 40 mesh. Coke slurry elemental analysis, ash content and gross heating value (GHV), determined following standard ASTM-D-3173, D-3174, D-3177, D-3178, D-3179, D-3286, D-3682 and D-3683 procedures, are given in Table III.

TABLE III

Coke and Coke Ash Analyses

| Coke Analysis: (in weight percent of coke) | |
|---|---|
| Carbon | 87.85% |
| Hydrogen | 1.87% |
| Nitrogen | 1.83% |
| Sulfur | 5.73% |
| Ash | 0.84% |
| Other (primarily oxygen) | 1.88% |
| Calculated GHV | 7,731 cal/g. |
| Ash Analysis: (in weight percent of ash) | |
| Sodium | 1.10% |
| Magnesium | 1.58% |
| Aluminum | 2.98% |
| Silicon | 4.47% |
| Phosphorous | 0.34% |
| Potassium | 0.31% |
| Calcium | 4.74% |
| Titanium | 0.18% |
| Vanadium | 21.23% |
| Chromium | 0.10% |
| Manganese | 0.21% |
| Iron | 14.42% |
| Nickel | 4.87% |
| Copper | 0.12% |
| Zinc | 0.23% |
| Strontium | 0.10% |
| Zirconium | 0.01% |
| Barium | 0.10% |
| Other (primarily O & S) | Balance |

Partial oxidation is conducted using an apparatus as shown in FIG. 1. The reactor is equipped to measure temperature using refractory thermocouples and an infrared ratio pyrometer. The thermocouples are located on the wall at the top, middle and bottom of the reaction chamber and the pyrometer is located on the wall at the middle of the reaction chamber.

The coke slurry is fed to the partial oxidation reactor through an inner annular passage of the burner at a rate of 18 meters per second (m/sec.). Free-oxygen-containing gas, having 99.75 volume % oxygen and 0.25 volume % argon, is fed through the center and outer annular passages of the burner at rates of 104 and 165 m/sec., respectively.

The partial oxidation reaction is conducted using a procedure similar to that described in U.S. Pat. No. 3,620,698 (Schlinger), which is incorporated herein by reference, and the procedure as described for, and apparatus as shown in, FIG. 1. After preheating the reactor, the feedstock is fed to the reactor and partial oxidation is conducted at temperatures, based on gas exit temperature, of from about 1,415° C. to about 1,526° C. and steady pressures of from about 35 to about 50 atmospheres. Product gas leaves the reactor through the outlet at a rate of about 4 m/sec. The average composition of the syngas product and other process parameters are given in Table IV.

TABLE IV

Partial Oxidation Process Performance

| Syngas Composition: (mole %) | |
|---|---|
| Ar | 0.08–0.09 |
| $H_2$ | 24.99–28.43 |
| CO | 50.32–55.05 |
| $CO_2$ | 11.40–15.42 |
| $N_2$ | 3.32–6.80 |

TABLE IV-continued

Partial Oxidation Process Performance

| | |
|---|---|
| $CH_4$ | 0.03–0.10 |
| $H_2S$ | 1.52–1.60 |
| COS | 0.05–0.06 |
| Syngas Flow Rate ($m^3$/sec) | 0.481–0.577 |
| Carbon Conversion (mole %) | 92.0–98.5 |

After about 160 hours, the reaction is stopped by discontinuing feedstock and oxygen addition. The reactor is purged with nitrogen and cooled to about 38° C. to permit direct observation of slag deposition. About 308 kilograms of slag is deposited in the reactor, including the outlet, which is about 25% of the ash produced during the reaction. Irregular slag deposits on the reactor walls displace from about 0 up to about 65% of the cross section of the reaction chamber. The outlet is cleared of slag deposits before deslagging.

Natural gas, having a composition given in Table V, is used as fuel for deslagging and fed to the center burner passage at a rate of about 110 m/sec.

Natural Gas Composition

| Component | Average Mole % |
|---|---|
| $CH_4$ | 94.04 |
| $C_2H_6$ | 2.92 |
| $C_3H_8$ | 0.52 |
| i-$C_4H_{10}$ | 0.06 |
| n-$C_4H_{10}$ | 0.10 |
| i-$C_5H_{12}$ | 0.03 |
| n-$C_5H_{12}$ | 0.02 |
| $C_6+$ | 0.00 |
| $CO_2$ | 0.67 |
| $N_2$ | 1.62 |

The slurry feed line and burner passage are cleaned with a water feed. Air, used to burn the fuel, is fed to both annular burner passages at about 61 m/sec. each. Before deslagging, the reactor is preheated under reducing atmosphere to about 1,300° C. and pressurized to about 13 atmospheres, using an air-fuel mixture having from about 65 to about 99 mole percent of the oxygen needed for complete fuel combustion. Deslagging is begun by slowly raising the air flow rate while lowering the fuel rate over 3½ hours. The oxygen partial pressure in the reactor is raised from substantially 0, usually less than 0.001 atmospheres, up to a calculated concentration about 0.5 atmospheres. The excess oxygen reacts with the solid vanadium trioxide in the slag to produce molten vanadium pentoxide as derivatized slag which, along with other slag, passes through the reactor outlet into a quench vessel containing quench water. The recovered slag is collected periodically in a lockhopper. The pH of the quench water drops from 5.7 prior to deslagging to 2.2. The burner is removed and the reactor visually inspected. Small quantities of slag are observed in the bottom sloping section and outlet of the reactor with the remaining walls essentially clean. The burner is replaced and deslagging continued at the same air and fuel rates of about 0.071 and 0.0055 $m^3$/sec., respectively, for another 3 hours at about 1,232° C. All slag is removed except for a minor amount of slag in the outlet. Substantially all of the slag deposited in the reactor is recovered.

Example 2C: Comparative Deslagging Attempt

Using gasification conditions similar to those given in Example 1, a partial oxidation of coke produces slag deposits in the reactor. Deslagging is attempted by removing the burner and allowing air to enter the reactor cooling the temperature to about 1,093° C. A preheat burner is used to increase the temperature to about 1,200° C. to maintain slag fluidity. The outlet becomes filled with slag which solidifies requiring mechanical removal.

We claim:

1. A process for removing slag from partial oxidation reactors which comprises:
   (1) stopping a partial oxidation reaction which has deposited solid slag in a partial oxidation reactor;
   (2) adding at least one derivatizing agent, which is a free-oxygen-containing or -producing material, to the reactor which reacts with the slag to make derivatized slag having a lower fluidizing point;
   (3) providing a temperature in the reactor at which derivatized slag fluidizes and leaves the reactor through an outlet; and
   (4) controlling the deslagging rate by regulating derivatizing agent and temperature levels in the reactor to prevent slag from filling the outlet.

2. The process of claim 1 wherein the slag comprises metal compound which is derivatized to a metal derivative having a lower melting point than the metal compound.

3. The process of claim 2 wherein the metal compound is trivalent vanadium compounds and the metal derivative is pentavalent vanadium compounds.

4. The process of claim 1 wherein the reactor temperature is above the melting point of the derivatized slag.

5. The process of claim 4 wherein the reactor temperature is above about 700° C.

6. The process of claim 1 wherein the temperature at the inside surface of the reactor is less than the temperature that would produce significant loss of refractory material lining the reactor.

7. The process of claim 6 wherein the temperature at the inside surface is less than about 1,600° C.

8. The process of claim 7 wherein the temperature at the inside surface is from about 600° C. to about 1,500° C.

9. The process of claim 1 wherein the reactor outlet temperature is above the derivatized slag fluidizing point preventing slag from solidifying in and blocking the outlet.

10. The process of claim 1 wherein the reactor temperature is controlled by adding hot gas to the reactor.

11. The process of claim 1 wherein the reactor is heated by reacting an oxidant with a fuel in the reactor.

12. The process of claim 11 wherein the oxidant is the derivatizing agent and has a concentration in the reactor provided by adding more oxidant than is consumed by fuel combustion.

13. The process of claim 11 wherein the amount of fuel added is controlled to give a reactor outlet temperature above the derivatized slag fluidizing point preventing the slag from solidifying in and blocking the outlet.

14. The process of claim 1 wherein the fuel is fluid organic feedstock for partial oxidation.

15. The process of claim 1 wherein the amount of slag is monitored.

16. The process of claim 15 wherein slag in the outlet is monitored by observing with a borescope, fiber optics, nuclear or sonar means, or by measuring temperature or pressure.

17. A process for making synthesis gas which comprises:
   (1) adding free-oxygen-containing gas and fluid organic feedstock containing slag-depositing material to a reactor;
   (2) reacting the feedstock and gas through a partial oxidation reaction to make synthesis gas containing hydrogen and carbon monoxide gases, which leave the reactor through an outlet, and slag which collects in the reactor;
   (3) recovering the synthesis gas; and removing slag by:
   (4) stopping the partial oxidation reaction;
   (5) adding at least one derivatizing agent, which is a free-oxygen-containing or -producing material, to the reactor which reacts with the slag to make derivatized slag having a lower fluidizing point;
   (6) providing a temperature in the reactor at which derivatized slag fluidizes and leaves the reactor through the outlet; and
   (7) controlling the deslagging rate by regulating derivatizing agent and temperature levels in the reactor to prevent slag from filling the outlet.

18. The process of claim 17 wherein the feedstock is coke containing vanadium.

19. The process of claim 17 wherein the partial oxidation reaction is resumed after slag is removed from the reactor.

20. The process of claim 19 wherein slag removal is repeated periodically.

21. A process for removing slag from partial oxidation reactors which comprises:
   (1) stopping a partial oxidation reaction which has deposited solid slag in a partial oxidation reactor;
   (2) adding as excess amount of at least one derivatizing agent, which is a free-oxygen-containing or -producing material, to the reactor which reacts with the slag to make derivatized slag having a lower fluidizing point and which amount increases the concentration of derivatizing agent in the reactor during the deslagging;
   (3) providing a temperature in the reactor at which derivatized slag fluidizes and leaves the reactor through an outlet; and
   (4) controlling the deslagging rate by regulating derivatizing agent and temperature levels in the reactor to prevent slag from filling the outlet.

22. The process of claim 21 wherein the derivatizing agent concentration increases from initially about 0 up to a partial pressure of at least about 0.5 atmospheres.

23. A process for removing slag from partial oxidation reactors which comprises:
   (1) stopping a partial oxidation reaction which has deposited solid slag in a partial oxidation reactor;
   (2) adding at least one derivatizing agent, which is a free-oxygen-containing or -producing material, to the reactor which reacts with the slag to make derivated slag having a lower fluidizing point;
   (3) providing a temperature in the reactor at which derivatized slag fluidizes and leaves the reactor through an outlet;
   (4) controlling the deslagging rate by regulating derivatizing agent and temperature levels in the reactor to prevent slag from filling the outlet; and
   (5) maintaining a temperature lower at the outlet.

24. The process of claim 23 wherein the outlet is at the base of the reactor and has a temperature which is from about 50° C. to about 500° C. less than the temperature near the top of the reactor.

25. A process for removing slag from partial oxidation reactors which comprises:
   (1) stopping a partial oxidation reaction which has deposited solid slag in a partial oxidation reactor;
   (2) adding at least one derivating agent, which is a free-oxygen-containing or -producing material, to the reactor which reacts with the slag to make derivatized slag having a lower fluidizing point;
   (3) providing a temperature in the reactor at which derivated slag fluidizes and leaves the reactor through an outlet; and
   (4) controlling the deslagging rate by regulating derivatizing agent and temperature levels in the reactor to prevent slag from filling the outlet by fluidizing slag at or near the outlet before other slag enters and fills the outlet.

* * * * *